United States Patent
Knaus

[11] 3,903,907
[45] *Sept. 9, 1975

[54] DENTAL FLOSS HOLDER

[76] Inventor: Heimo A. Knaus, Rt. 3, Box 552-B, Escondido, Calif. 92025

[*] Notice: The portion of the term of this patent subsequent to Sept. 18, 1990, has been disclaimed.

[22] Filed: Apr. 6, 1973

[21] Appl. No.: 348,735

Related U.S. Application Data
[63] Continuation-in-part of Ser. No. 239,994, March 31, 1972, Pat. No. 3,759,273.

[52] U.S. Cl. ................................ 132/92 R
[51] Int. Cl. ................................ A61c 15/00
[58] Field of Search ............... 132/92, 91, 90

[56] References Cited
UNITED STATES PATENTS
3,759,273   9/1973   Knaus .................... 132/92 R Primary Examiner—G. E. McNeill
Attorney, Agent, or Firm—Brown & Martin

[57] ABSTRACT

A dental floss holder comprising a unit including a container for a spool of dental floss and a fork having tines across which the floss is stretched, there being a gated opening at the end of each tine into which the floss can be snapped rather than threaded, and a sliding bar lock extending through a passage in the container which, when slid into the locking position, engages first the floss from the spool, then the loose end of the floss and upon further sliding tautens the floss stretched across the tines. A cutter is mounted on the continer.

9 Claims, 10 Drawing Figures

DENTAL FLOSS HOLDER

BACKGROUND OF THE INVENTION

This application is a continuation-in-part of application Ser. No. 239,994, filed Mar. 31st, 1972 now U.S. Pat. No. 3,759,273, issued Sept. 18, 1973.

1. FIELD OF THE INVENTION

The invention is directed to dental floss holders in which the floss is stretched between two tines of a fork and locked in stretched position.

2. DESCRIPTION OF THE PRIOR ART

The prior art is disclosed in the U.S. Pat. Nos. to Byars, 1,833,671; Swartzman, 2,451,181; Atols, 2,516,539; Wright, et al, 2,577,597; and Parks, Jr., 2,870,773; and Waters, 3,421,524. This prior art includes structure of the type in which the soiled floss must engage the clean floss when the floss is stretched over tines, thus causing fouling of the floss prior to being in usable condition.

In addition, in prior art models the floss is either stretched over grooves in the ends of the tines, in which case dislodging of the floss may occur during use, or the floss is tediously threaded through two eyelets provided in the tine ends.

SUMMARY OF THE INVENTION

The dental floss holder comprises a unit that includes a container for a spool of dental floss and a fork having tines about which the floss is strung. Two paths are provided for guiding the floss, one for the unused section of the floss and a separate path for the soiled section of the floss. A lock provides for stretching the floss between the tines while simultaneously locking both sections of the floss in position. The end of each tine is formed with an opening for the floss with opposed spring arms defining a gate to the opening so that a section of floss can be snapped between the opposed spring arms into the opening without threading.

Other features and the advantages of the present invention will be apparent from the following description, reference being made to the accompanying drawings wherein a preferred embodiment of the invention is illustrated.

DESCRIPTION OF THE PREFERRED EMBODIMENT

Figure 1:
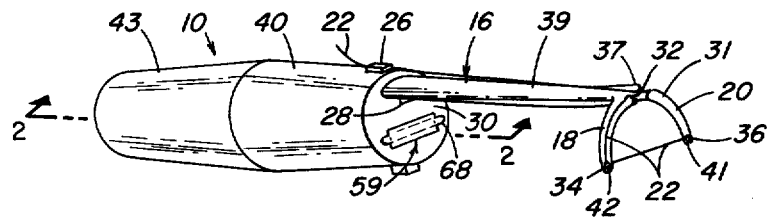
FIG. 1 is a perspective view of the dental floss holder showing the floss in stretched and in locked position.

The holder 10 is a unit that includes a container 12 for a spool 14 of dental floss, a fork 16 having tines 18 and 20. The floss 22 extends from the spool 14 through a channel 24 in a shiftable lock 26 and then through an orifice 28 in an end wall 30 of the container 12. The floss is strung along the underside of the fork, then upwardly about the outer side of the yoke 31 then through a notch 32 in the yoke, then along the outer side of tine 18, through an opening 34 in the outer end of that tine, then through an opening 36 in the outer end of the tine 20, then along the outer side of the latter tine, then about a protuberance 37 adjacent the end of the body 39 of the fork, and then through a channel 38 in lock 26.

A notch similar to notch 32 is provided in the yoke at the upper end of tine 20 whereby, instead of lacing the floss through notch 32, it can be laced through the notch located at the upper end of tine 20 and then strung along the outer side of tine 20 through opening 36 of tine 20, through opening 34 in tine 18, then about protuberance 37, then through channel 38 in the lock 26.

By pushing inwardly on the lock, the sections of floss within the channel 24 and 38 will be locked in position. During the locking action, those sections will be pulled away from the fork resulting in pulling the floss tightly between the ends of the tines 18 and 20.

Figure 2:
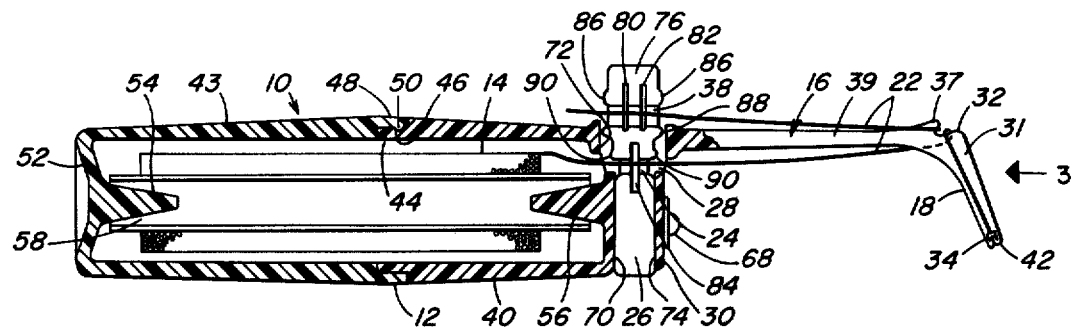
FIG. 2 is a side view of the holder, but on a larger scale, the casing thereof being shown in section, the section being taken along line 2—2 of FIG. 1, and showing the lock in unlocked position.
Figure 3:
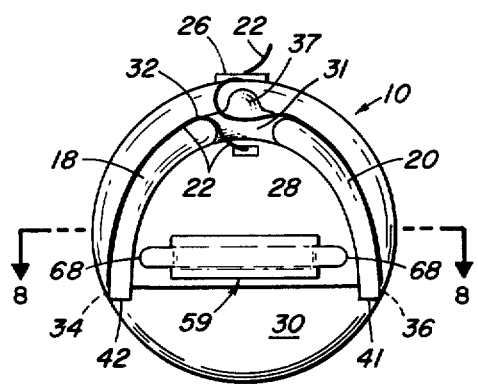
FIG. 3 is an end view of the holder, looking in the direction of arrows 3 of FIG. 3, but on a larger scale.
Figure 8:
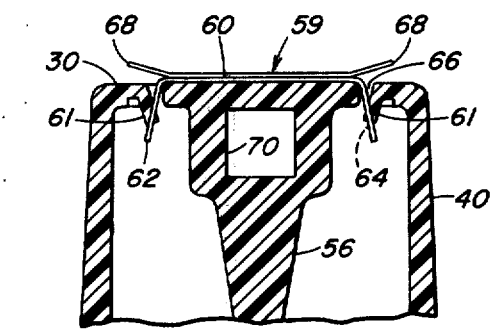
FIG. 8 is a sectional view taken along line 8—8 of FIG. 3, but on a larger scale.

The tines 18 and 20, in addition to extending downwardly from the yoke, extend outwardly as viewed in FIGS. 1 and 2. The design in the unit is such that easy access can be had not only for cleaning between the front teeth, but also for cleaning between the extreme rear teeth.

Figure 9:
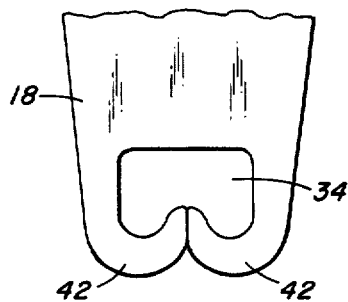
FIG. 9 is an enlarged view of the end of a tine showing the floss-holding means.

The openings 34 and 36 in the outer ends of tines 18 and 20, respectively, are each closed by a pair of resilient arms 42 and 41, respectively, as best illustrated in FIG. 9. The arms of each pair are opposed as shown, and act as a one-way gate into the respective opening, so that a taut length of floss pressed between a pair of arms will separate the arms and snap into the opening, and once securely within the opening the floss cannot become dislodged. The prospect of having to tediously thread the floss through the openings is thus eliminated.

Referring more in detail to the drawings, the container 12 includes a tubular front section 40, including the end wall 30, the fork 16 being formed integrally with that section. Container 12 also includes a tubular rear section 43. At least one of the sections 40 or 43 is formed of resilient and flexible material such as a plastic. Preferably, both are formed of that material. The rear end of section 40 is provided with a ledge 44 having a notch 46, and the front end of section 43 is provided with a ledge 48 having a bead 50 which complements the notch 46 in ledge 44. The container sections can be removably connected with one another by engaging ledges 44 and 46 so that bead 50 seats in notch 46.

The end wall 52 of container section 43 is provided with an inwardly extending projection 54, and a like projection 56 extends inwardly from end wall 30 of section 40. These projections extend into the hollow core 58 of floss spool 14 to support the spool.

Figure 10:
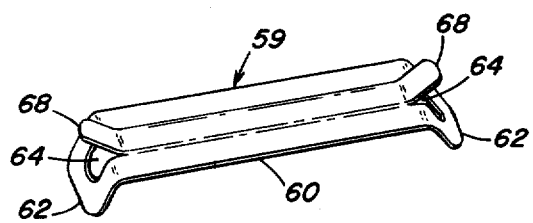
FIG. 10 is a perspective view of the floss cutter removed from the holder.

One of the walls of container 12, and preferably the front side of end wall 30, carries a floss cutter 58, which is preferably stamped out of a single metal sheet, as can be visualized from FIG. 10. The floss cutter has a base 60 with the raised blades 68 and two downwardly bent resilient extensions 62 with two apertures 64 formed in the end portion by the striking and raising of blades 68. End wall 30 is provided with two holes 66. On the inner surface of end wall 30 and adjacent the holes 66 are two tabs 61 projecting in a direction slightly inclined toward one another. During assembly, the floss cutter is pressed onto end wall 30 so that extensions 62 extend through holes 66 and tabs 61 snap into engagement with the apertures 64 of the resilient extensions 62 of the cutter base.

Figure 4:
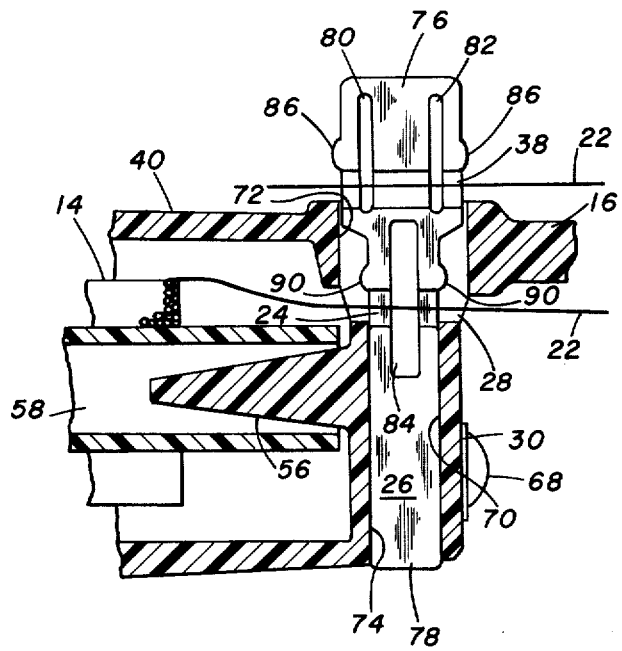
FIG. 4 is a fragmentary sectional view of the holder taken along line 2—2 of FIG. 1, but on a still larger scale, the view showing the lock in unlocked position.
Figure 5:
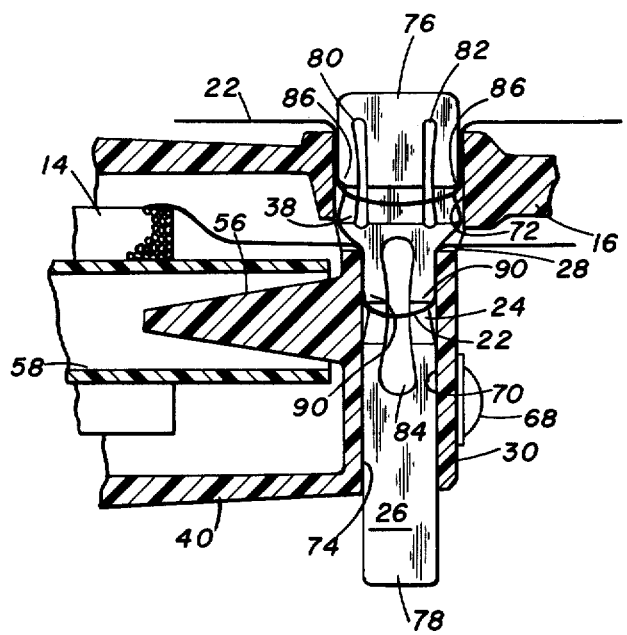
FIG. 5 is a view similar to FIG. 4, but showing the lock in locked position.

FIGS. 2 and 4 show the lock in unlocked position whereby the floss can be pulled readily from the container 12, and FIG. 5 shows the lock in floss-locking position.

Figure 6:
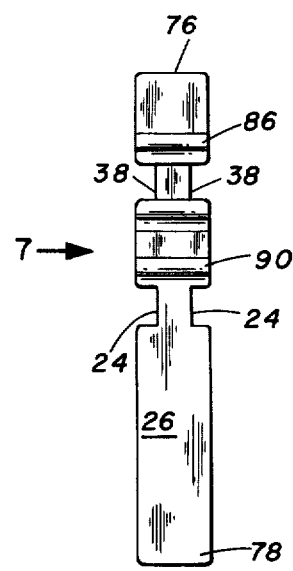
FIG. 6 is an enlarged view of the lock, looking in the direction of arrows 6 in FIG. 7.
Figure 7:
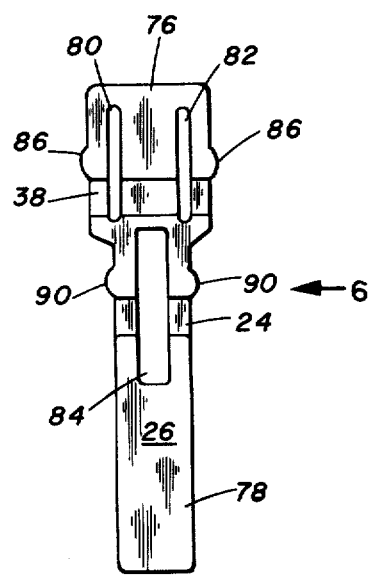
FIG. 7 is also an enlarged view of the lock, looking in the direction of arrows 7 in FIG. 6.

Referring to FIGS. 2, 4, 5 and 8, it will be seen that the front end of container 12 is provided with a non-circular and vertically extending passage 70, the upper portion 72 of which is wider that the lower portion 74. This passage 70 receives the lock 26. Referring to FIGS. 6 and 7, it will be observed that the lock 26 complements the non-circular passage 70 and that the upper portion 76 thereof is wider that the lower portion 78. The upper portion 76 of the lock is provided with vertically extending slots 80 and 82 which span the channels 38, and the lower portion 78 of the lock is provided with a vertically extending slot 84 that spans the channels 24 whereby the sides of the lock can be flexed inwardly. The opposite sides of the upper portion of the lock are provided with beads 86 that span the upper sides of chanels 38. Beads 90 on the lock span the upper sides of channels 24.

The lock 26 is formed preferably of resilient and flexible material. Referring to FIGS. 4 and 7, it will be seen that the width of the lock, including beads 86, is greater than the width of the upper part of passage 70 and that the width of the lock, including the beads 90, is greater than the width of the lower part of passage 70. Thus, it will be observed that, due to the fact that the lock is formed of flexible material, the slots 80, 82 and 84 permit the pushing inwardly of the lock and also provide for resiliently retaining the lock in locked position.

From the foregoing it will be observed that channels 24, the orifice 28 and channels 38 are passages for the floss.

Referring to FIGS. 2 and 4, it will be seen from FIG. 2 that floss can flow freely from the spool of floss, but when the lock 26 is pressed inwardly to the position shown in FIG. 5, the floss is locked in position between the beads 90 and the lower walls that form the passage 70, and is locked in position between the beads 86 and the upper walls that form the passage 70.

When the lock 26 is in the locked position, as shown in FIG. 5 the lower end thereof protrudes below the container 12. The lock can be released by pushing upwardly on the lower end of the lock.

The distance between the beads 86 and 90 is slightly greater than the distance between the upper side of orifice 28 and the outer surface of front section 42 adjacent to the upper portion of the lock 76. Therefore, the floss is locked in position adjacent the spool 14 prior to being locked in position at the upper part of the lock. Consequently, by pulling on the floss to the left of the lock and simultaneously pushing the lock inwardly, the floss is firmly stretched across the tines. The stretch is also augmented while the lock is being pushed downwardly, drawing the floss away from the fork.

From the foregoing it is apparent that by virtue of the present invention, I have provided material improvements over the prior art of dental floss holders. The holder of the present invention is relatively more simple and, therefore, less expensive to produce. Too, by the present construction, the soiled section of the floss is never brought into contact with the clean section of floss.

Having described my invention, I claim:

1. A dental floss holder, comprising in combination:
A. means forming:
1. a hollow casing for receiving a spool of dental floss, said casing having:
a. an end wall having:
i. an orifice through which dental floss is threadable,
b. a passage extending transversly of and through said hollow casing and communicating with said orifice,
c. a fork connected with the end wall, said fork having:
i. a pair of tines, each of said tines having a means in the end thereof for retaining a section of dental floss, said means in the end of said tines for retaining a section of the dental floss comprising an opening and opposed spring arms self-biased into contact with each other and defining a one-way gate into said opening,
ii. means adjacent the junction of said tines and forming a guide for the floss,
B. a shiftable bar-lock in said passage, said bar-lock having:
1. a channel extending transversly of the bar-lock and alignable with said orifice for receiving a section of the dental floss,
2. a second channel disposed parallelly of the first mentioned channel in the lock for receiving another section of the dental floss, said bar-lock being shiftable from a position in which the second channel lies outside said transverse passage in the hollow casing to a position in which the first mentioned channel in the lock is in non-aligned position with the orifice in the end wall and in which the second mentioned channel in the lock extends into the transverse passage in the hollow casing, the width of the lock and the width of the walls forming the transverse passage in the hollow casing being such so as to lock both sections of the floss between the walls of the bar-lock and the walls of the transverse passage when the bar-lock has been moved to the second mentioned position.

2. A dental floss holder as defined in claim 1, characterized in that the transverse passage in the hollow casing extends therethrough and further characterized in that the bar lock is extendable through the transverse passage.

3. A dental floss holder as defined in claim 1, characterized in that the width of the transverse passage adjacent the bar lock is narrower at the first mentioned channel in the lock than at the second mentioned channel and that the width of a section of the lock adjacent the orifice in the end wall is narrower than that section of the lock lying adjacent the second mentioned channel in the lock.

4. A dental floss holder as defined in claim 1, characterized in that the sections of the lock extend in the transverse passage in the hollow casing have a width that is greater than the width of the said transverse passage and are formed of flexible and resilient material.

5. A dental floss holder as defined in claim 1, characterized in that the bar lock is elongate and is formed of resilient and flexible material and further characterized in that the lock is provided with longitudinally extending slots that span the channels in the lock.

6. A dental floss holder as defined in claim 1, characterized in that the transverse passage in the hollow casing is non-circular and further characterized in that the outer surface of the lock at least partly complements the inner surface of the said transverse passage.

7. A dental floss holder as defined in claim 1, characterized to include:
  A. a thread cutter assembly comprising:
    1. a base having:
      a. flexible and resilient extensions, each having an aperture therein,
    2. a cutter blade fixed to the base; and further characterized in that the end wall of the casing includes holes that receive said extensions, and tabs integral with the inner surface of the end wall, adjacent to the holes, and disposed to engage the apertures of said resilient extensions.

8. A dental floss holder as defined in claim 1, characterized in that said spring arms are unitary with the respective tines.

9. A dental floss holder as defined in claim 1, characterized in that said channels in the lock bar are spaced and disposed such that when the lock is being pushed in a section of floss in the first mentioned channel is locked before a section of floss in the second mentioned channel is locked.

* * * * *